(12) United States Patent
Matsuda et al.

(10) Patent No.: US 9,753,600 B2
(45) Date of Patent: Sep. 5, 2017

(54) TOUCH PANEL

(71) Applicant: FUJITSU COMPONENT LIMITED, Tokyo (JP)

(72) Inventors: Genichi Matsuda, Tokyo (JP); Satoshi Sakurai, Tokyo (JP); Nobuyoshi Shimizu, Tokyo (JP); Yuji Makiuchi, Tokyo (JP); Mitsuhiro Sekizawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/182,716

(22) Filed: Jun. 15, 2016

(65) Prior Publication Data

US 2016/0291739 A1    Oct. 6, 2016

Related U.S. Application Data

(62) Division of application No. 13/450,616, filed on Apr. 19, 2012, now Pat. No. 9,395,861.

(30) Foreign Application Priority Data

Apr. 25, 2011 (JP) .................................. 2011-097609

(51) Int. Cl.
*G06F 3/041* (2006.01)
*G06F 3/045* (2006.01)

(52) U.S. Cl.
CPC ............ *G06F 3/045* (2013.01); *G06F 3/0416* (2013.01); *G06F 2203/04103* (2013.01); *G06F 2203/04104* (2013.01)

(58) Field of Classification Search
None
See application file for complete search history.

(56) References Cited

U.S. PATENT DOCUMENTS 5,432,304 A     7/1995 Tanahashi
5,589,857 A     12/1996 Tanahashi et al.
(Continued)

FOREIGN PATENT DOCUMENTS

JP    H11-353101    12/1999
JP    2004-037350    2/2004
(Continued)

*Primary Examiner* — Kent Chang
*Assistant Examiner* — Benjamin Morales Fernande
(74) *Attorney, Agent, or Firm* — IPUSA, PLLC

(57) ABSTRACT

A touch panel including upper and lower electrode substrates including upper and lower conductive layers, respectively; first and second electrodes respectively provided at both ends of the upper conductive layer in a first direction for causing an electric potential distribution in the first direction; third and fourth electrodes respectively provided at both ends of the lower conductive layer in a second direction perpendicular to the first direction for causing an electric potential distribution in the second direction; a flexible substrate provided to be connected to the lower electrode substrate or the upper electrode substrate; a first resistor portion electrically connected to either of the first or second electrode and formed at the upper electrode substrate or the flexible substrate; and a second resistor portion connected to either of the third or fourth electrode and formed at the lower electrode substrate or the flexible substrate.

6 Claims, 16 Drawing Sheets

(56) References Cited

U.S. PATENT DOCUMENTS

| | | | |
|---|---|---|---|
| 5,844,175 | A | 12/1998 | Nakanishi et al. |
| 6,191,828 | B1 * | 2/2001 | Kim et al. ............ G06F 3/0412 |
| | | | 345/174 |
| 6,204,897 | B1 * | 3/2001 | Colgan et al. ...... G02F 1/13338 |
| | | | 349/111 |
| 7,227,537 | B2 | 6/2007 | Nakayama et al. |
| 7,455,529 | B2 | 11/2008 | Fujii et al. |
| 8,482,537 | B2 | 7/2013 | Shimizu et al. |
| 2003/0132920 | A1 | 7/2003 | Lee et al. |
| 2004/0056669 | A1 | 3/2004 | Morimoto |
| 2007/0128948 | A1 | 6/2007 | Nakanishi et al. |
| 2009/0072670 | A1 | 3/2009 | Hansson et al. |
| 2009/0189877 | A1 | 7/2009 | Washino et al. |
| 2009/0322701 | A1 | 12/2009 | D'Souza et al. |
| 2010/0164902 | A1 | 7/2010 | Yeh et al. |
| 2010/0214263 | A1 * | 8/2010 | Yeh ........................ G06F 3/045 |
| | | | 345/174 |
| 2010/0265198 | A1 | 10/2010 | Kondoh et al. |
| 2010/0309163 | A1 | 12/2010 | Yeh et al. |
| 2011/0050620 | A1 * | 3/2011 | Hristov ................. G06F 3/0416 |
| | | | 345/174 |
| 2011/0157061 | A1 * | 6/2011 | Kao ........................ G06F 3/045 |
| | | | 345/173 |
| 2011/0157082 | A1 * | 6/2011 | Lin ........................ G06F 3/045 |
| | | | 345/174 |

FOREIGN PATENT DOCUMENTS

| | | |
|---|---|---|
| JP | 2004-272722 | 9/2004 |
| JP | 2008-293129 | 12/2008 |
| JP | 2009-176114 | 8/2009 |
| WO | 2009025269 | 2/2009 |

* cited by examiner

TOUCH PANEL

CROSS-REFERENCE TO RELATED APPLICATION

This application is a divisional application of U.S. patent application Ser. No. 13/450,616 filed on Apr. 19, 2012, which claims the benefit of priority of Japanese Patent Application No. 2011-97609 filed on Apr. 25, 2011, where the entire contents of all of these applications are incorporated herein by reference.

BACKGROUND OF THE INVENTION

1. Field of the Invention

The present invention relates to a touch panel.

2. Description of the Related Art

A touch panel is an input device usually provided in front of a display and capable of inputting data. A user can directly input data based on information visually grasped by viewing the display through the touch panel, so that the touch panel is used in various ways.

A resistive touch panel is widely known. For the resistive touch panel, transparent conductive layers are respectively formed on an upper conductive substrate and on a lower conductive substrate where the transparent conductive layers are positioned to face each other. When force is applied to a point of the upper conductive substrate, the transparent conductive layers of the upper conductive substrate and the lower conductive substrate contact at that point. At this time, a potential gradient is generated on one of the transparent conductive layers so that a coordinate position of the pushed point can be detected by reading an electric potential of the other of the transparent conductive layers.

Resistive touch panels mainly include a four-wire type and a five-wire type. For the four-wire type, electrodes for applying potential gradients in an X-axis direction and in a Y-axis direction are respectively provided on one and the other of the upper conductive substrate and the lower conductive substrate. For the five-wire type, electrodes for applying potential gradients in both the X-axis direction and the Y-axis are provided on the lower conductive substrate, and the upper conductive substrate functions as a probe to read an electric potential (see Patent Documents 1, 2 and 3).

Specifically, with reference to FIG. 1 and FIG. 2, the four-wire type touch panel is explained. FIG. 1 is a cross-sectional view of a four-wire type touch panel. FIG. 2 is a perspective view of the four-wire type touch panel.

The four-wire type touch panel includes an upper electrode substrate including a film 10 and a transparent conductive layer 30 which is formed at one surface of the film 10, a lower electrode substrate including a glass 20 and a transparent conductive layer 40 which is formed at one surface of the glass 20, and a spacer 50. The spacer 50 is provided between the transparent conductive layer 30 and the transparent conductive layer 40 such that the transparent conductive layer 30 and the transparent conductive layer 40 facing each other. The four-wire type touch panel is electrically connected to a host computer or the like through a cable, not shown in the drawings.

Electrodes 31 and 32 are provided on the surface of the film 10, on which the transparent conductive layer 30 is also formed, at both ends in an X-axis direction along a Y-axis direction. Similarly, electrodes 41 and 42 are provided on the surface of the glass 20, on which the transparent conductive layer 40 is also formed, at both ends in the Y-axis direction along the X-axis direction.

For the four-wire type touch panel, an operation of detecting a position of the touch panel while being touched is explained.

First, as shown in FIG. 3, voltages are applied to the electrodes 31 and 32 of the upper electrode substrate. Specifically, the electrode 31 is grounded (0V) and the electrode 32 is applied with Vcc, for example, 5V. At this state, when a touch pen 60 or the like touches a point "A" of the touch panel, the transparent conductive layer 30 of the upper electrode substrate and the transparent conductive layer 40 of the lower electrode substrate contact at the point "A". As a potential gradient is generated in the X-axis direction, the electric potential at the point "A" can be detected by measuring the electric potential of the transparent conductive layer 40 when the transparent conductive layer 30 and the transparent conductive layer 40 are contacted at the point "A". The electric potential corresponds to a value of the voltage applied by the electrodes 32 and 31 and divided by the resistance of the transparent conductive layer 30 at the point "A" in the X-axis direction. The electric potential is detected by a voltage meter 70 through the electrode 41 provided on the transparent conductive layer 40. Subsequently, as shown in FIG. 4, an X coordinate of the point "A" is detected based on the voltage "Va" measured by the voltage meter 70.

Next, as shown in FIG. 5, voltages are applied to the electrodes 41 and 42 of the lower electrode substrate. Specifically, the electrode 41 is grounded (0V) and the electrode 42 is applied with Vcc, for example, 5V. Similar to the above described upper electrode substrate, when the touch pen 60 or the like touches the point "A" of the touch panel, the transparent conductive layer 30 of the upper electrode substrate and the transparent conductive layer 40 of the lower electrode substrate contact at the point "A". As the transparent conductive layer 40 is applied with voltages by the electrodes 41 and 42 to generate a potential gradient in the Y-axis direction and the transparent conductive layer 30 and the transparent conductive layer 40 are contacted at the point "A", the electric potential at the point "A" can be detected by measuring the electric potential of the transparent conductive layer. The electric potential corresponds to a value of the voltage applied by the electrodes 41 and 42 and divided by the resistance of the transparent conductive layer 40 at the point "A" in the Y-axis direction. The electric potential is detected by a voltage meter 80 through the electrode 31 provided on the transparent conductive layer 30. Subsequently, as shown in FIG. 6, a Y coordinate of the point "A" is detected based on the voltage "Vb" measured by the voltage meter 80.

With the above operations, the X coordinate and the Y coordinate of the point "A" can be obtained so that two-dimensional positions of the point "A" can be grasped.

For the four-wire type touch panel, the operation in which the transparent conductive layer 30 of the upper electrode substrate is applied with voltages and the transparent conductive layer 40 of the lower electrode substrate detects the electric potential, and the operation in which the transparent conductive layer 40 of the lower electrode substrate is applied with voltages and the transparent conductive layer 30 of the upper electrode substrate detects the electric potential, are alternately performed to enable a successive positional detection.

However, for the above described four-wire type touch panel, it is capable of detecting a position when a single point is touched, but it is impossible to detect plural positions when plural points are touched at the same time.

As shown in FIG. 7, similar to that shown in FIG. 3, the electrodes 31 and 32 of the upper electrode substrate are applied with voltages, for example, the electrode 31 is grounded (0V) and the electrode 32 is applied with Vcc, 5V. At this state, if touch pens 61 and 62 or the like touch the touch panel at points "B" and "C", respectively, at the same time, the coordinates of the points "B" and "C" cannot be detected.

When the two points "B" and "C" of the touch panel are touched at the same time, the electric potential Vx at a middle point of the points "B" and "C" is detected at the transparent conductive layer 40, as shown in FIG. 8. Therefore, even if two points are touched on the touch panel, as the detected electric potential is just a single value, it is detected as if a single point is touched. Thus, each of the two coordinates corresponding to the points "B" and "C" cannot be detected.

Therefore, in Patent Document 4, a touch panel capable of detecting multi-touches by electrically connecting resistors to the transparent conductive layers 30 and 40, respectively.

PATENT DOCUMENT

[Patent Document 1] Japanese Laid-open Patent Publication No. 2004-272722
[Patent Document 2] Japanese Laid-open Patent Publication No. 2008-293129
[Patent Document 3] Japanese Laid-open Patent Publication No. H11-353101
[Patent Document 4] Japanese Laid-open Patent Publication No. 2009-176114

However, for the touch panel disclosed in Patent Document 4, as the resistors are provided outside of the touch panel, this causes the size of the device to be larger and the cost of the touch panel to be higher.

SUMMARY OF THE INVENTION

According to an embodiment, there is provided a touch panel including an upper electrode substrate including an upper conductive layer; a lower electrode substrate including a lower conductive layer; a first electrode and a second electrode respectively provided at both ends of the upper conductive layer in a first direction for causing an electric potential distribution in the first direction; a third electrode and a fourth electrode respectively provided at both ends of the lower conductive layer in a second direction perpendicular to the first direction for causing an electric potential distribution in the second direction; a flexible substrate provided to be connected to the lower electrode substrate or the upper electrode substrate; a first resistor portion electrically connected to either of the first electrode or the second electrode and formed at the upper electrode substrate or the flexible substrate; and a second resistor portion connected to either of the first the third electrode or the fourth electrode and formed at the lower electrode substrate or the flexible substrate.

According to another embodiment, there is provided a touch panel including an upper electrode substrate including an upper conductive layer; a lower electrode substrate including a lower conductive layer; a first electrode and a second electrode respectively provided at both ends of the upper conductive layer in a first direction for causing an electric potential distribution in the first direction; a third electrode and a fourth electrode respectively provided at both ends of the lower conductive layer in a second direction perpendicular to the first direction for causing an electric potential distribution in the second direction; a first resistor portion electrically connected to either of the first electrode or the second electrode and formed at the upper electrode substrate; and a second resistor portion connected to either of the third electrode or the fourth electrode and formed at the lower electrode substrate.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
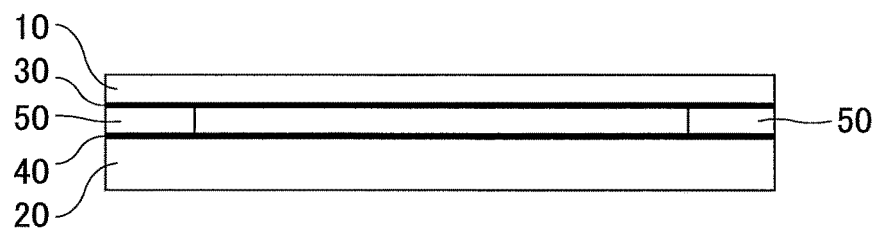
FIG. 1 is a cross-sectional view of a general four-wire type touch panel.
Figure 2:
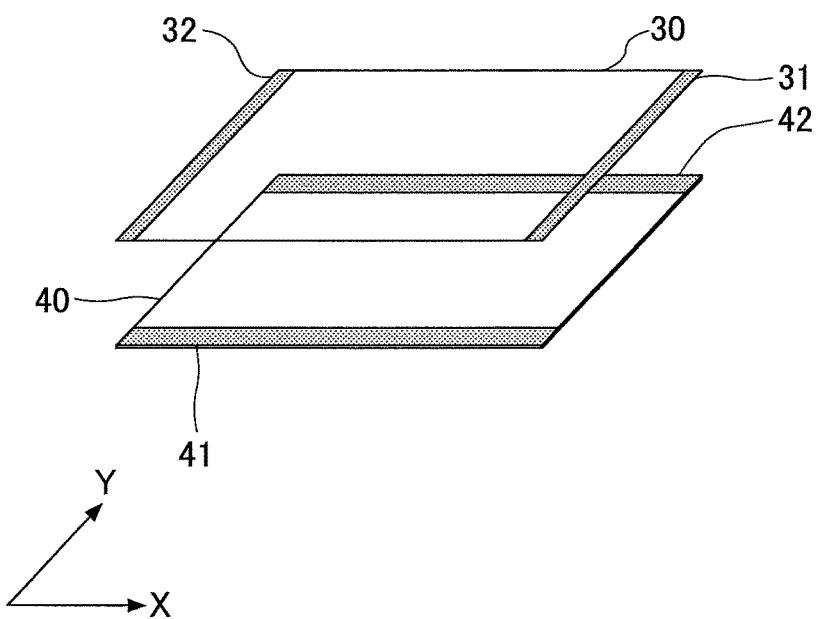
FIG. 2 is a perspective view of a general four-wire type touch panel.
Figure 3:
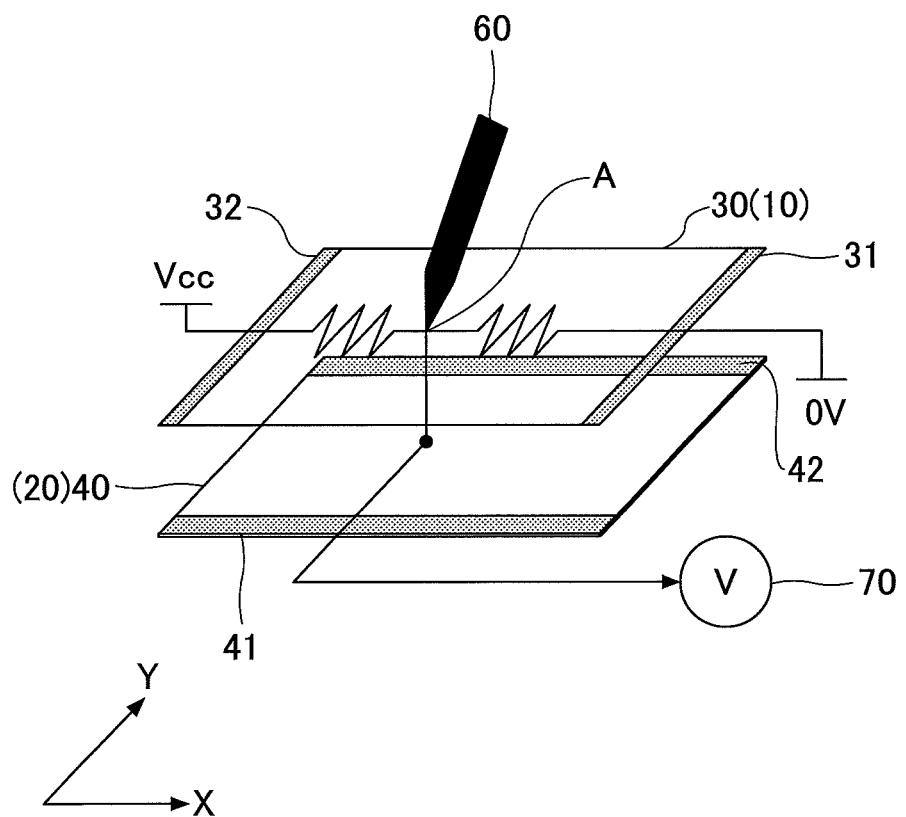
FIG. 3 is a perspective view of a general four-wire type touch panel in which a coordinate in an X-axis direction is detected.
Figure 4:
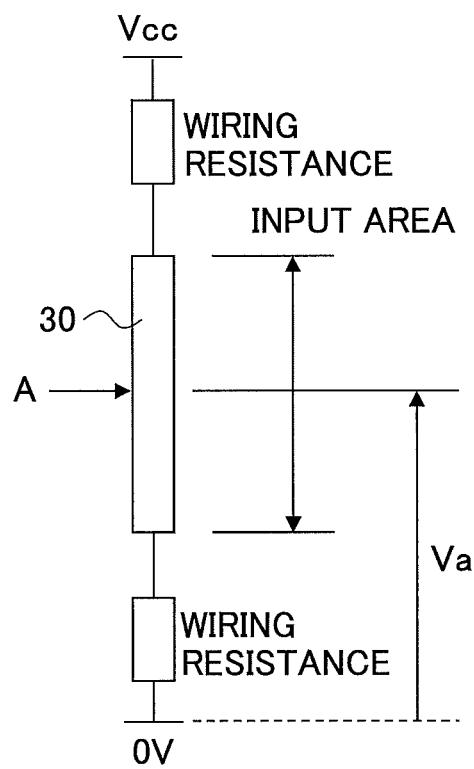
FIG. 4 is a view for explaining an electric potential and a touched point in the X-axis direction.
Figure 5:
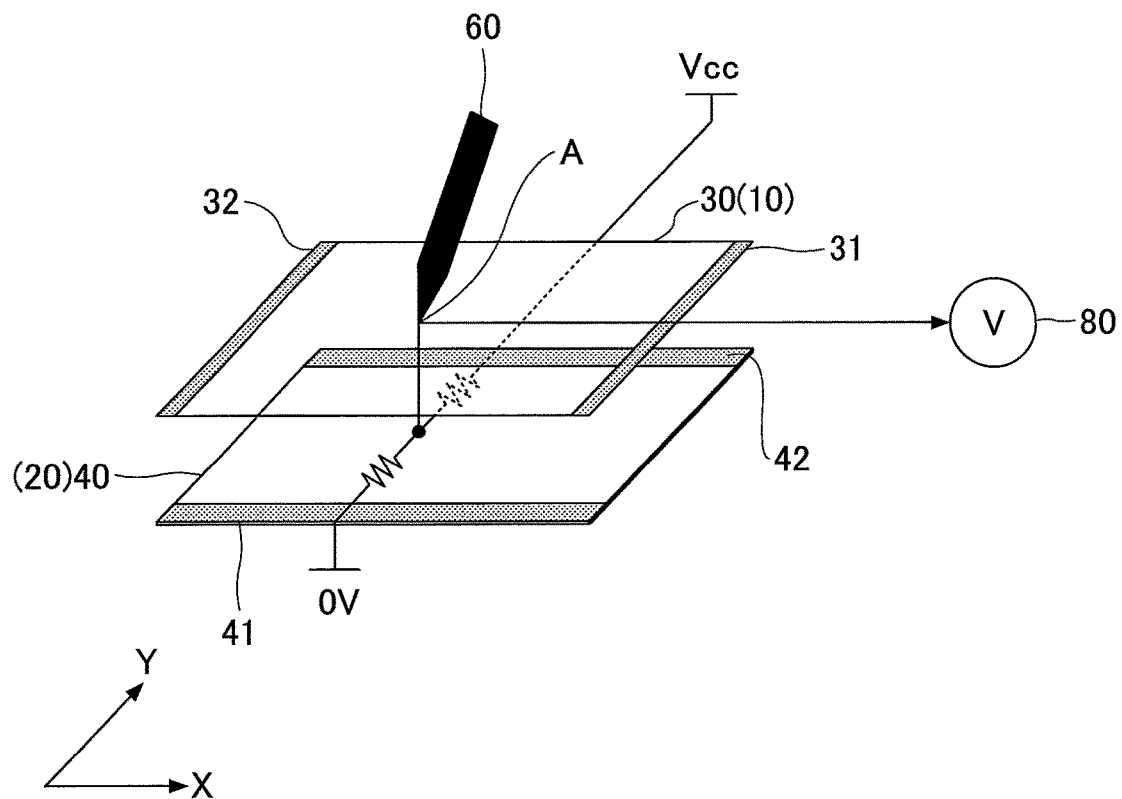
FIG. 5 is a perspective view of a general four-wire type touch panel in which a coordinate in a Y-axis direction is detected.
Figure 6:
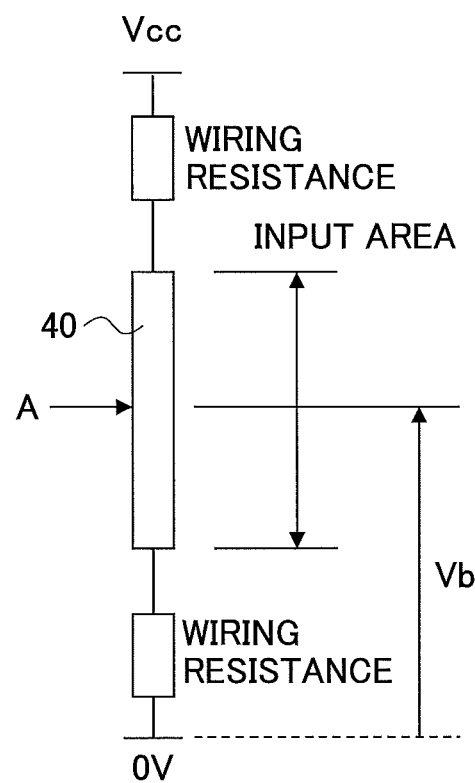
FIG. 6 is a view for explaining an electric potential and a touched point in the Y-axis direction.
Figure 7:
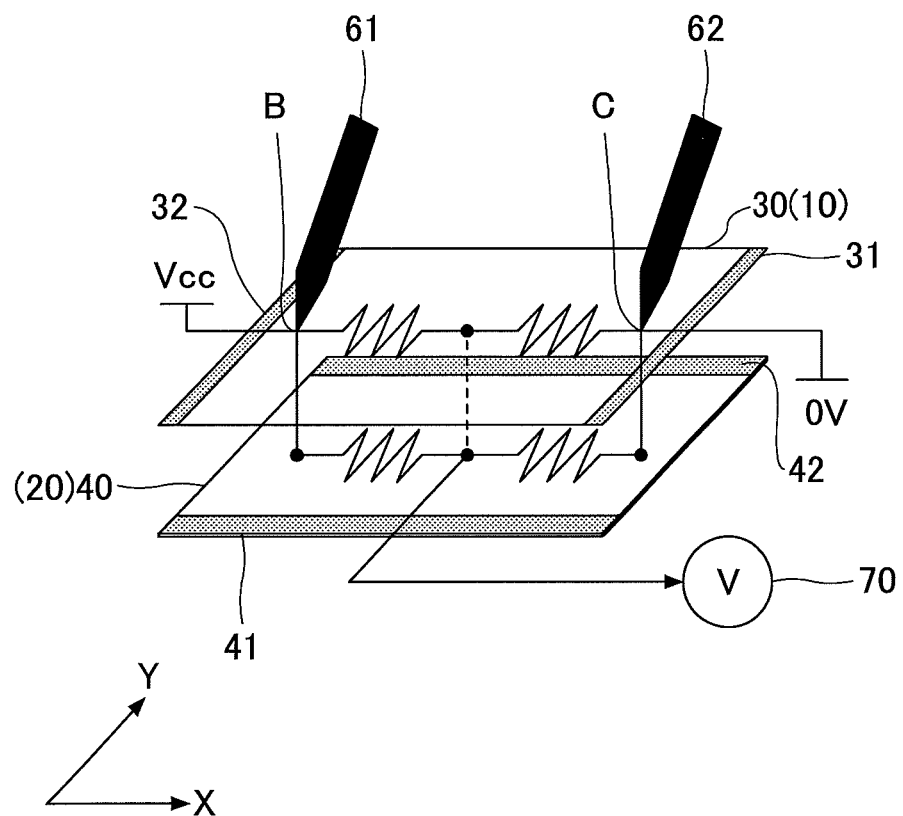
FIG. 7 is a perspective view of a general four-wire type touch panel in which two points are touched.
Figure 8:
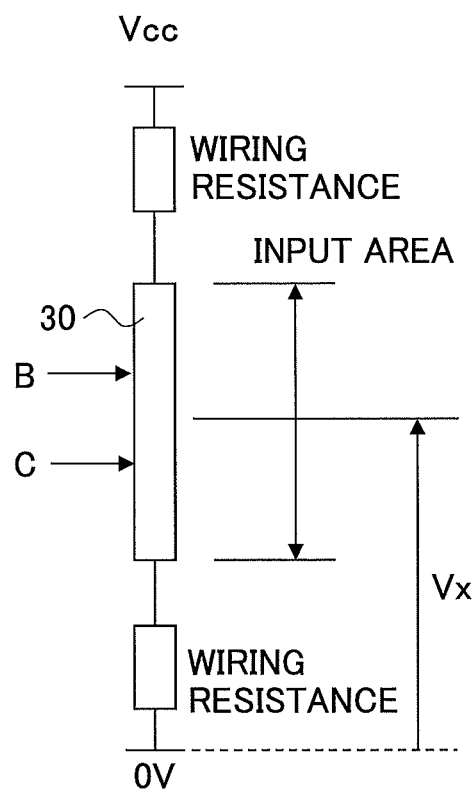
FIG. 8 is a view for explaining an electric potential and touched points when two points are touched.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment

A touch panel of the first embodiment is explained.

Figure 9:
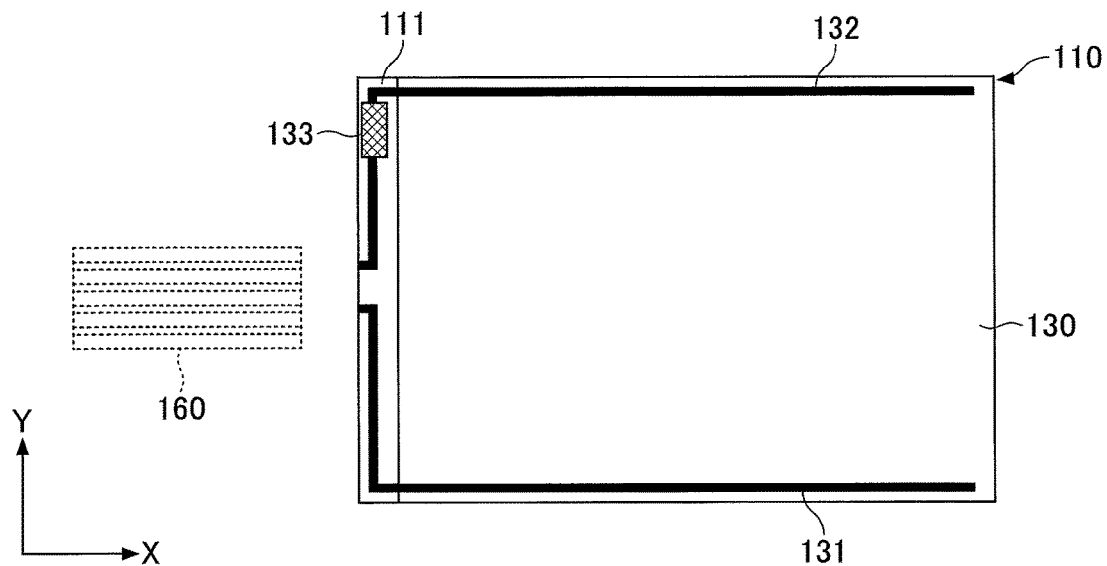
FIG. 9 is a plan view of an example of an upper electrode substrate of a touch panel of a first embodiment.
Figure 10:
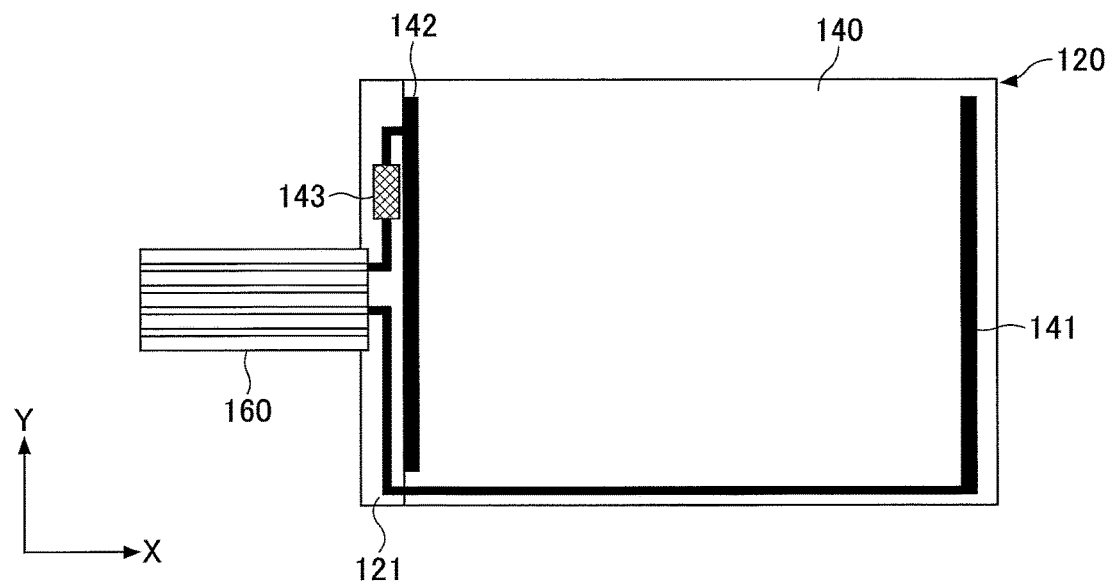
FIG. 10 is a plan view of an example of a lower electrode substrate of a touch panel of the first embodiment.
Figure 11:
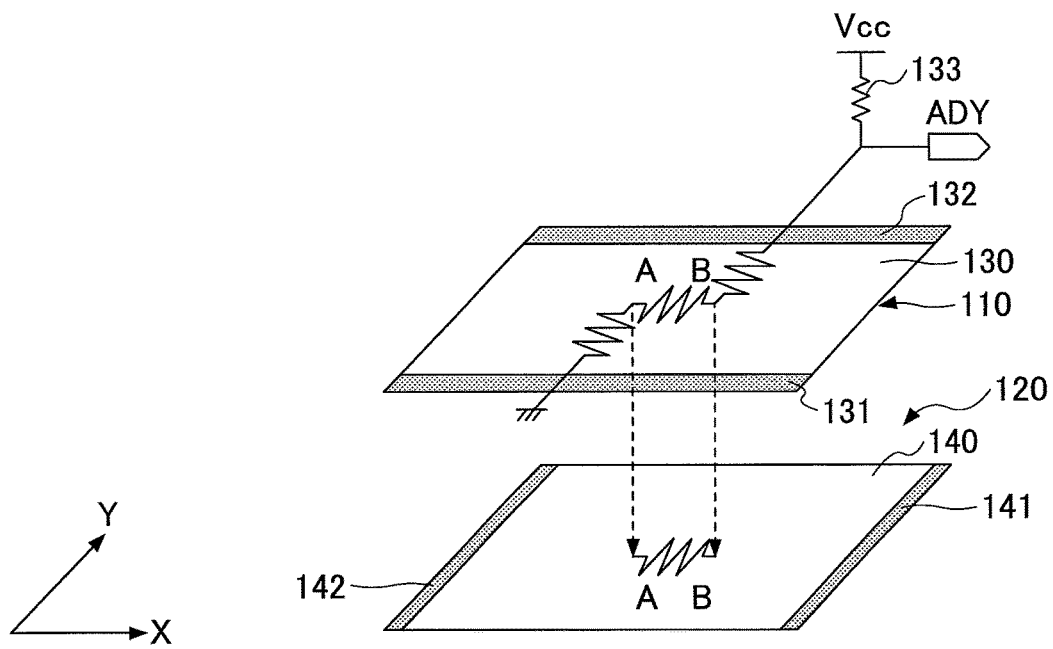
FIG. 11 is a perspective view of an example of the touch panel of the first embodiment.
Figure 12:
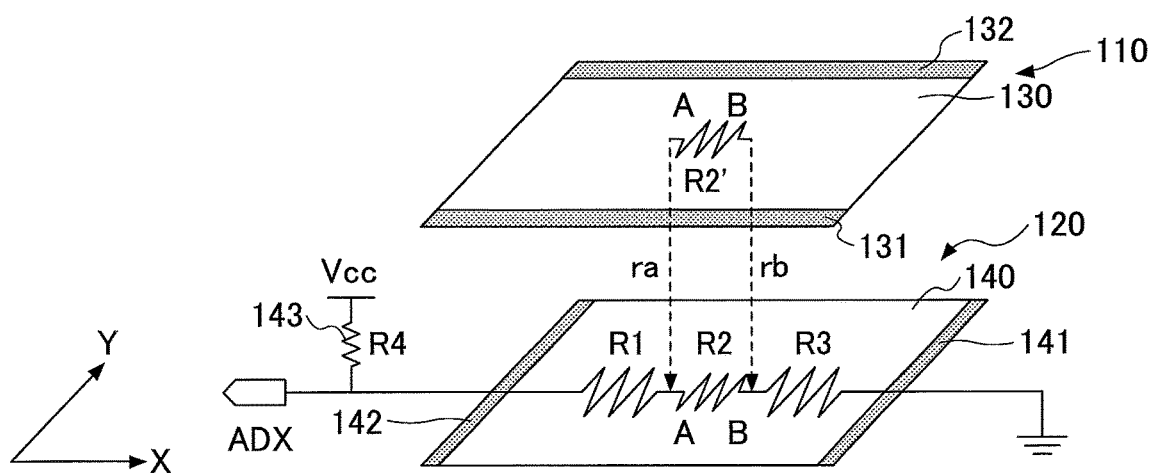
FIG. 12 is a perspective view of an example of the touch panel of the first embodiment.

FIG. 9 is a plan view of an example of an upper electrode substrate 110 of a touch panel of a first embodiment. FIG. 10 is a plan view of an example of a lower electrode substrate 120 of the touch panel of the first embodiment. FIG. 11 and FIG. 12 are perspective views of an example of the touch panel of the first embodiment.

Referring to FIG. 9 to FIG. 12, the touch panel of the embodiment includes the upper electrode substrate 110 and the lower electrode substrate 120.

As shown in FIG. 9, the upper electrode substrate 110 includes a substantially rectangular insulating film substrate 111, a transparent upper conductive layer 130 (an example of an upper conductive layer) formed at one surface of the insulating film substrate 111, and electrodes 131 and 132 (examples of second and first electrodes) positioned near ends of the transparent upper conductive layer 130 in a Y-axis direction along an X-axis direction.

The transparent upper conductive layer 130 is made of an Indium Tin Oxide (ITO) or the like. The electrodes 131 and 132 are respectively made of metal or the like.

The touch panel of the embodiment further includes a first resistor portion 133 formed on the insulating film substrate 111 and connected to the electrode 132.

As shown in FIG. 10, the lower electrode substrate 120 includes a substantially rectangular glass substrate 121 corresponding to the upper electrode substrate 110, a transparent lower conductive layer 140 (an example of a lower conductive layer) formed at one surface of the glass substrate 121, and electrodes 141 and 142 (examples of fourth and third electrodes) positioned near ends of the transparent lower conductive layer 140 in the X-axis direction along the Y-axis direction.

The transparent lower conductive layer 140 is made of an ITO or the like. The electrodes 141 and 142 are respectively made of metal or the like.

The touch panel of the embodiment further includes a second resistor portion 143 formed on the glass substrate 121 and connected to the electrode 142.

Although not shown in the drawings, dot spacers or the like may be provided at the surface of the transparent upper conductive layer 130 or the transparent lower conductive layer 140, in accordance with necessity.

The upper electrode substrate 110 and the lower electrode substrate 120 are stacked such that the transparent upper conductive layer 130 and the transparent lower conductive layer 140 face each other and the peripheral portions of the upper electrode substrate 110 and the lower electrode substrate 120 are bonded by a double-sided tape, an adhesive resin, paste or the like.

The touch panel of the embodiment further includes a flexible substrate 160 for connecting the electrodes 131, 132, 141 and 142 or the like with an external device.

FIG. 11 and FIG. 12 show resistors generated in the transparent upper conductive layer 130 and the transparent lower conductive layer 140 when points A and B are touched at the same time.

FIG. 11 shows a status where a voltage Vcc is applied to the electrode 132 through the first resistor portion 133 while the electrode 131 is grounded (0V) at the upper electrode substrate 110. FIG. 12 shows a status where a voltage Vcc is applied to the electrode 142 through the second resistor portion 143 while the electrode 141 is grounded (0V) at the lower electrode substrate 120.

As shown in FIG. 11 and FIG. 12, for the touch panel of the embodiment, by generating electric potential distributions in the X-axis direction and the Y-axis direction alternately, and detecting the electric potentials in the generated electric potential distributions, an operation of multi-touch can be detected.

Specifically, referring to FIG. 12, while applying the voltages Vcc and 0V between the electrodes 142 and 141 of the lower electrode substrate 120, respectively, when the points A and B, which are positioned at different coordinates in the X-axis direction, are touched, the current also flows between the points A and B of the transparent upper conductive layer 130 of the upper electrode substrate 110. This current causes the contact resistances ra and rb between the transparent conductive layers 140 and 130, and the resistance R2' by the transparent upper conductive layer 130.

Figure 24:
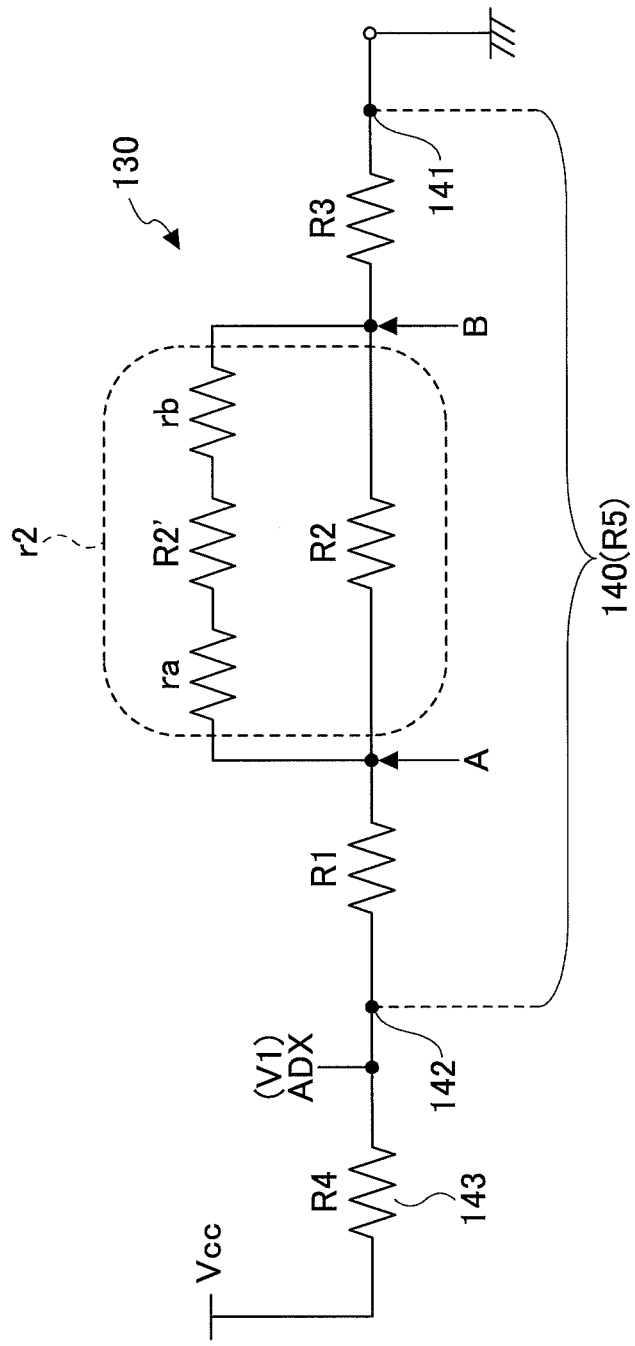
FIG. 24 is a circuit diagram of the touch panel of the first embodiment showing the status corresponding to FIG. 12.

FIG. 24 shows a circuit diagram of the touch panel of the first embodiment showing the status corresponding to FIG. 12. In this case, between the voltages Vcc and 0V, the resistance R4 of the second resistor portion 143, the resistance R1 of the transparent lower conductive layer 140 between the electrode 142 and the point "A", the resistance R2 between the points "A" and "B", the resistance R3 of the transparent lower conductive layer 140 between the point "B" and the electrode 141 exist. Further, a parallel circuit of the contact resistance ra, the resistance R2' of the transparent upper conductive layer 130 between the points "A" and "B", and the contact resistance rb is generated with respect to the resistance R2. When such a parallel circuit is generated, the resistance R5 between the electrodes 142 and 141 becomes lower compared with a case where only a single point is touched and such a parallel circuit is not generated.

In this case, the voltage V1 detected at the point ADX becomes V1=R5/(R4+R5) where R5=R1+r2+R3 (r2 is the resistance value of the entire between the points "A" and "B").

At this time, the resistance R4 of the second resistor portion 143 does not change and functions as a reference resistor. Thus, similar to the technique disclosed in Japanese Laid-open Patent Publication No. 2009-176114 (Patent Document 4), by detecting the voltage value at the point ADX, and comparing the detected voltage value with a predetermined threshold value, whether plural points are touched can be determined. Further, the longer the distance between the points "A" and "B", the lower the resistance R5 between the electrodes 142 and 141 becomes. Thus, the distance between the points "A" and "B" can be determined based on the detected voltage value.

Similarly, for the case when two points, which are positioned at different coordinates in the Y-axis direction, are touched, whether the plural points are touched and the distance between the points can be detected by detecting the voltage value at the point ADY (see FIG. 11).

Referring back to FIG. 9 and FIG. 10, for the insulating film substrate 111 composing the upper electrode substrate 110, a material(s) selected from a group of polyethylene terephthalate, poly-carbonate, heat-resistant poly-carbonate, polyethylene naphthalate, polyethersulfone, cyclic polyolefin, polynorbornene, polyarylate, polypropylene, heat-resistant nylon and the like may be used.

Further, for the lower electrode substrate 120, a plastic substrate may be used instead of the glass substrate 121. For the plastic substrate, a material(s) selected from poly-carbonate, heat-resistant poly-carbonate, polyacrylate, polymethacrylate, polyethylene naphthalate, polyethersulfone, cyclic polyolefin, polynorbornene, polyarylate, polypropylene, heat-resistant nylon and the like may be used.

Further, although the example where the transparent upper conductive layer 130 and the transparent lower conductive layer 140 are made of ITO is descried in this embodiment, instead of ITO, a material which is transparent and has electric conductivity such as a material obtained by adding Al, Ga or the like to ZnO (zinc oxide), a material obtained by adding Sb or the like to $SnO_2$ (tin oxide) or the like may be used.

For the touch panel of the embodiment, the first resistor portion 133 is provided at the upper electrode substrate 110, and the second resistor portion 143 is provided at the lower electrode substrate 120.

As shown in FIG. 9, the first resistor portion 133 provided at the upper electrode substrate 110 may be formed by removing the transparent upper conductive layer 130 of the upper electrode substrate 110 at a region where the first resistor portion 133 is to be formed and then printing carbon paste for forming resistance (hereinafter, referred to as "resistance paste" as well) or the like at the region where the transparent upper conductive layer 130 is removed. Alternatively, the first resistor portion 133 may be formed by forming an insulating layer on the region of the transparent upper conductive layer 130 of the upper electrode substrate 110 where the first resistor portion 133 is to be formed, and then printing the carbon paste or the like on the insulating layer.

The first resistor portion 133 is formed to function as a reference resistor for detecting multi-touches in the Y-axis direction based on a voltage value at a point (ADY) between the electrode 132 and the first resistor portion 133 when the predetermined voltages as described above are applied between an end of the first resistor portion 133, which is opposite to an end connected to the electrode 132, and the electrode 131 (similar to that shown in FIG. 24).

The first resistor portion 133 may be formed to have a resistance value greater than or equal to 25% and less than or equal to 200% of a resistance value of the transparent upper conductive layer 130 between the electrodes 131 and 132. Preferably, the first resistor portion 133 may be formed to have a resistance value of about 70%, for example, of the resistance value of the transparent upper conductive layer 130 between the electrodes 131 and 132.

One end of the first resistor portion 133 is connected to the electrode 132 through a leader line or the like, while the other end of the first resistor portion 133 is connected to the flexible substrate 160 through a leader line or the like.

As shown in FIG. 10, the second resistor portion 143 provided at the lower electrode substrate 120 may be formed by removing the transparent lower conductive layer 140 of the lower electrode substrate 120 at a region where the second resistor portion 143 is to be formed and then printing the carbon paste or the like at the region where the transparent lower conductive layer 140 is removed. Alternatively, the second resistor portion 143 may be formed by forming an insulating layer on the region of the transparent lower conductive layer 140 of the lower electrode substrate 120 where the second resistor portion 143 is to be formed, and then printing carbon paste or the like on the insulating layer.

The second resistor portion 143 is formed to function as a reference resistor for detecting multi-touches in the X-axis direction based on a voltage value at a point (ADX) between the electrode 142 and the second resistor portion 143 when the predetermined voltages as described above are applied between an end of the second resistor portion 143, which is opposite to an end connected to the electrode 142, and the electrode 141 (see FIG. 24).

The second resistor portion 143 may be formed to have a resistance value greater than or equal to 25% and less than or equal to 200% of a resistance value of the transparent lower conductive layer 140 between the electrodes 141 and 142. Preferably, the second resistor portion 143 may be formed to have a resistance value of about 70%, for example, of the resistance value of the transparent lower conductive layer 140 between the electrodes 141 and 142.

One end of the second resistor portion 143 is connected to the electrode 142 through a leader line or the like, while the other end of the second resistor portion 143 is connected to the flexible substrate 160 through a leader line or the like.

Next, a method of manufacturing the touch panel of the embodiment is explained.

Figure 13:
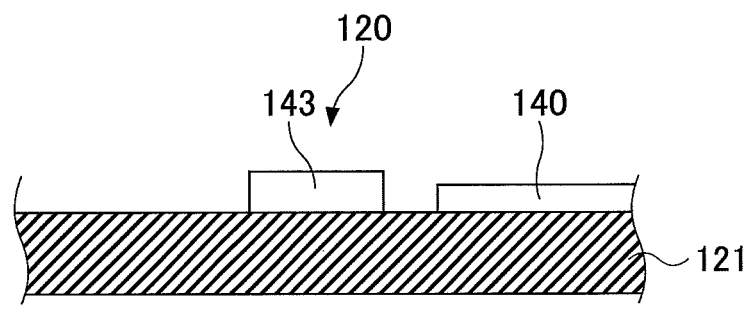
FIG. 13 is a cross-sectional view of an example of a resistor portion of the touch panel of the first embodiment.

First, a method of forming the lower electrode substrate 120 of the touch panel of the embodiment is explained with reference to FIG. 10 and FIG. 13. An ITO layer, which becomes the transparent lower conductive layer 140, is formed on the glass substrate 121 (having a thickness about 1.1 mm). Then, a peripheral portion of the ITO layer is removed by etching to form the transparent lower conductive layer 140. At this time, the region of the ITO layer where the second resistor portion 143 is to be formed may be also removed.

Then, dot spacers may be formed on the transparent lower conductive layer 140 by photoresist (not shown in the drawings). Subsequently, the electrodes 141 and 142, the leader line or the like are formed on the transparent lower conductive layer 140 by screen printing using silver paste. Then, as shown in FIG. 13, the second resistor portion 143 is formed at a region on the glass substrate 121 where the transparent lower conductive layer 140 is removed. Specifically, the second resistor portion 143 is formed by printing carbon paste at the region on the glass substrate 121 where the transparent lower conductive layer 140 is removed, being dried and being baked. The second resistor portion 143 is formed to be electrically connected to the electrode 142 through the leader line or the like.

Here, for an example, the resistance value of the second resistor portion 143 is 430Ω, and the resistance value of the transparent lower conductive layer 140 between the electrode 141 and the electrode 142 is 620Ω. Thus, the resistance value of the second resistor portion 143 is about 69% of the resistance value of the transparent lower conductive layer 140 between the electrode 141 and the electrode 142.

Figure 14:
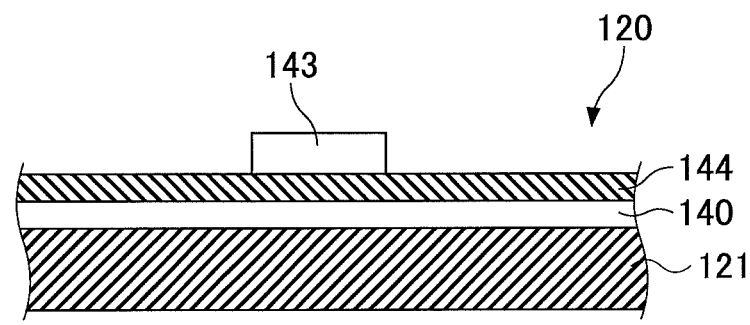
FIG. 14 is a cross-sectional view of another example of a resistor portion of the touch panel of the first embodiment.

Alternatively, as shown in FIG. 14, the second resistor portion 143 may be formed on the transparent lower conductive layer 140 through an insulating layer 144. In this example, the insulating layer 144 is formed at a region on the transparent lower conductive layer 140 where the second resistor portion 143 is to be formed by vapor deposition such as sputtering or the like, or printing. Then, the second resistor portion 143 is formed on the insulating layer 144 by printing or the like.

A method of forming the upper electrode substrate 110 of the touch panel of the embodiment is explained with reference to FIG. 9. An ITO layer, which becomes the transparent upper conductive layer 130, is formed on the insulating film substrate 111 (having a thickness of about 188 μm). Then, a peripheral portion of the ITO layer is removed by etching to form the transparent upper conductive layer 130. At this time, the region of the ITO layer where the first resistor portion 133 is to be formed may be also removed.

Subsequently, the electrodes 131 and 132, the leader line or the like are formed on the transparent upper conductive layer 130 by screen printing using silver paste. Then, similar to the second resistor portion 143 as shown in FIG. 13, the first resistor portion 133 is formed at a region on the insulating film substrate 111 where the transparent upper conductive layer 130 is removed. Specifically, the first resistor portion 133 is formed by printing carbon paste at the region on the insulating film substrate 111 where the transparent upper conductive layer 130 is removed, being dried and being baked. The first resistor portion 133 is formed to be electrically connected to the electrode 132 through the leader line or the like.

Here, for an example, the resistance value of the first resistor portion 133 is 255Ω, and the resistance value of the transparent upper conductive layer 130 between the electrode 131 and the electrode 132 is 380Ω. Thus, the resistance value of the first resistor portion 133 is about 67% of the resistance value of the transparent upper conductive layer 130 between the electrode 131 and the electrode 132.

Alternatively, similar to the second resistor portion 143 as shown in FIG. 14, the first resistor portion 133 may be formed on the transparent upper conductive layer 130 through an insulating layer. In this example, the insulating layer is formed at a region on the transparent upper conductive layer 130 where the first resistor portion 133 is to be formed by vapor deposition such as sputtering or the like, or printing. Then, the first resistor portion 133 is formed on the insulating layer by printing or the like.

Then, the upper electrode substrate 110 and the lower electrode substrate 120 are bonded such that the transparent upper conductive layer 130 and the transparent lower conductive layer 140 face each other by a double-sided tape or the like, not shown in the drawings. Then, the leader lines connected to the electrodes 131 and 132, or the electrode 141 and 142 are connected to the flexible substrate 160 by a thermo-compression bonding or the like.

Then, a control circuit for the touch panel is connected to the touch panel.

Then, the operation of the touch panel is confirmed. As a result, the touch panel can properly detect a gesture operation such as enlarging, reducing, rotating or the like by multi-touches, so that a smooth operation will be performed.

Further, a heat shock test (−40° C. to +85° C., each 0.5 hour, 1000 cycles) is performed. As a result, initial characteristics are maintained and a high reliability is confirmed. Further, a high temperature high humidity storage test (85° C., 85% (Relative Humidity: RH), 1000 hours) is performed. As a result, initial characteristics are maintained and no error is observed.

Although the example where the second resistor portion 143 is formed by printing the carbon paste is described in this embodiment, a resistor chip (400Ω, for example), which is formed on the glass substrate 121 and is electrically connected to the electrode 142 through an electric conductive adhesive, may be used for the second resistor portion 143. Similarly, a resistor chip, which is formed on the insulating film substrate 111 and is electrically connected to the electrode 132 through an electric conductive adhesive, may be used for the first resistor portion 133.

Second Embodiment

The second embodiment is explained. In this embodiment, resistor portions corresponding to the first resistor portion 133 and the second resistor portion 143 of the first embodiment are provided at a flexible substrate instead of providing the resistor portions on the upper electrode substrate 110 and the lower electrode substrate 120. With this structure, an area of the touch panel can be enlarged. Further, as the upper electrode substrate and the lower electrode substrate of any type can be used, the cost of the touch panel can be reduced.

Figure 15:
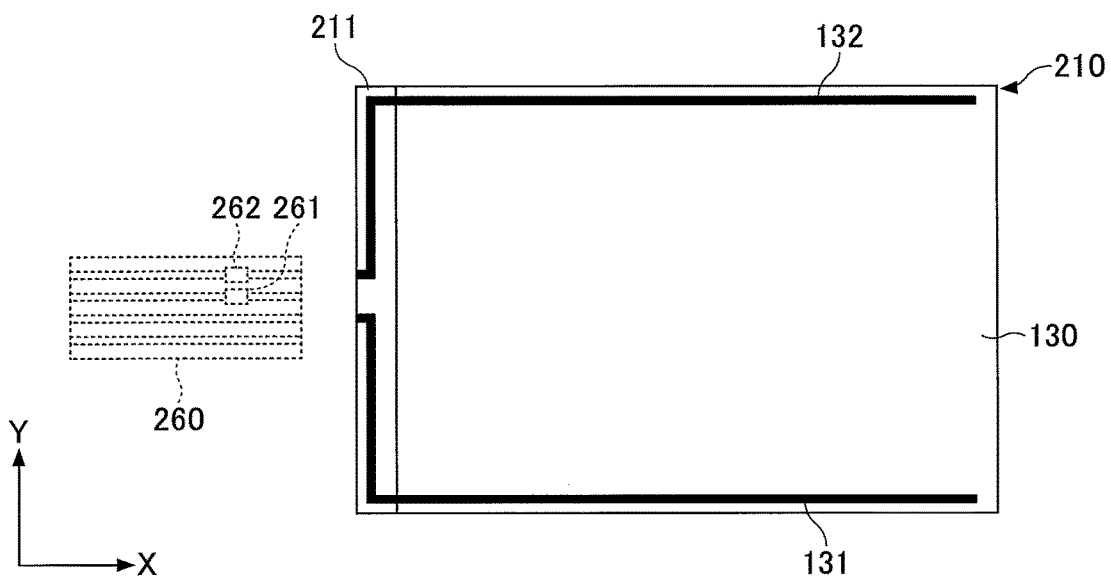
FIG. 15 is a plan view of an example of an upper electrode substrate of a touch panel of a second embodiment.
Figure 16:
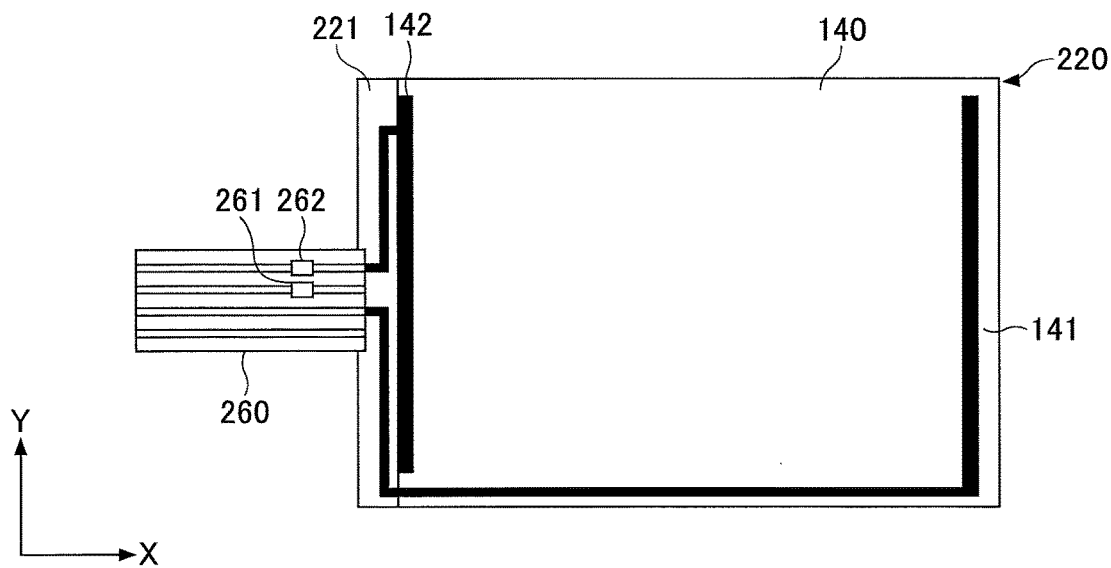
FIG. 16 is a plan view of an example of a lower electrode substrate of a touch panel of the second embodiment.

FIG. 15 is a plan view of an example of an upper electrode substrate 210 of a touch panel of the second embodiment. FIG. 16 is a plan view of an example of a lower electrode substrate 220 of the touch panel of the second embodiment.

The touch panel of the embodiment is explained with reference to FIG. 15 and FIG. 16. The touch panel of the embodiment includes the upper electrode substrate 210 and the lower electrode substrate 220.

As shown in FIG. 15, the upper electrode substrate 210 includes a substantially rectangular insulating film substrate 211, the transparent upper conductive layer 130 formed at one surface of the insulating film substrate 211, and the electrodes 131 and 132 positioned near ends of the transparent upper conductive layer 130 in the Y-axis direction along the X-axis direction.

The transparent upper conductive layer 130 is made of an ITO or the like. The electrodes 131 and 132 are respectively made of metal or the like.

As shown in FIG. 16, the lower electrode substrate 220 includes a substantially rectangular glass substrate 221 corresponding to the upper electrode substrate 210, the transparent lower conductive layer 140 formed at one surface of the glass substrate 221, and the electrodes 141 and 142 positioned near ends of the transparent lower conductive layer 140 in the X-axis direction along the Y-axis direction.

The transparent lower conductive layer 140 is made of an ITO or the like. The electrodes 141 and 142 are respectively made of metal or the like.

The upper electrode substrate 210 and the lower electrode substrate 220 are stacked such that the transparent upper conductive layer 130 and the transparent lower conductive layer 140 face each other and the peripheral portions of the upper electrode substrate 210 and the lower electrode substrate 220 are bonded by a double-sided tape, an adhesive resin, paste or the like.

The touch panel of the embodiment further includes a flexible substrate 260 for connecting the electrodes 131, 132, 141 and 142 or the like with an external device.

The touch panel of the embodiment further includes a first resistor chip 261 and a second resistor chip 262 provided in the flexible substrate 260. The first resistor chip 261 is provided at a predetermined interconnect portion of the flexible substrate 260 such that the first resistor chip 261 is electrically connected with the electrode 132 of the upper electrode substrate 210. The second resistor chip 262 is provided at a predetermined interconnect portion of the flexible substrate 260 such that the resistor chip 262 is electrically connected with the electrode 142 of the lower electrode substrate 220.

For the touch panel of the embodiment as well, similar to the touch panel of the first embodiment, a good characteristic can be obtained. Further, an area of the touch panel can be enlarged. Further, the touch panel having a multi-touch detecting function can be manufactured with a lower cost.

Third Embodiment

The third embodiment is explained. In this embodiment, resistor portions are made of the same material as that of the transparent conductive layers of the upper electrode substrate and the lower electrode substrate, respectively.

Figure 17:
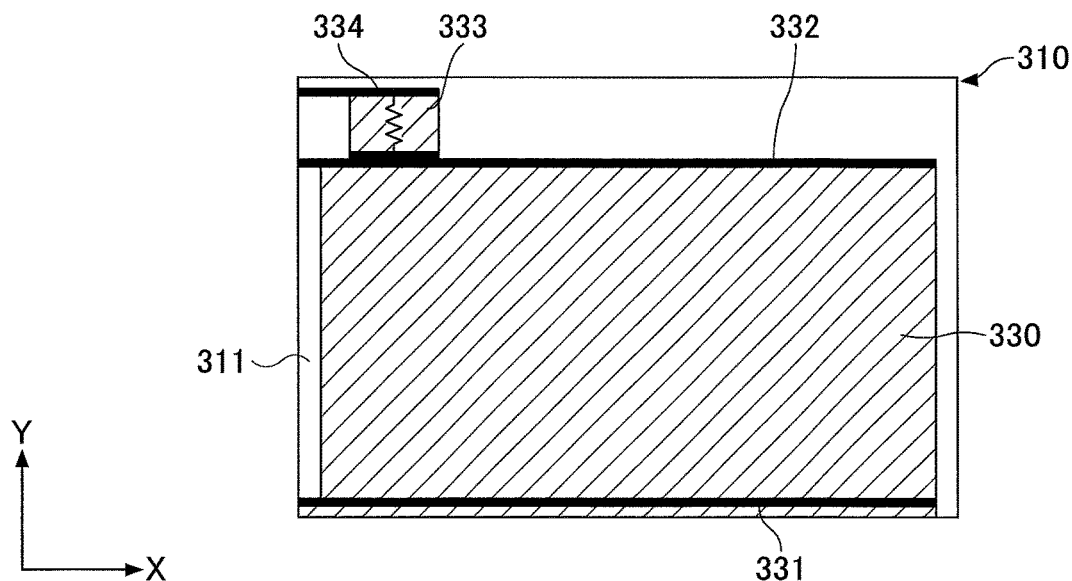
FIG. 17 is a plan view of an example of an upper electrode substrate of a touch panel of a third embodiment.
Figure 18:
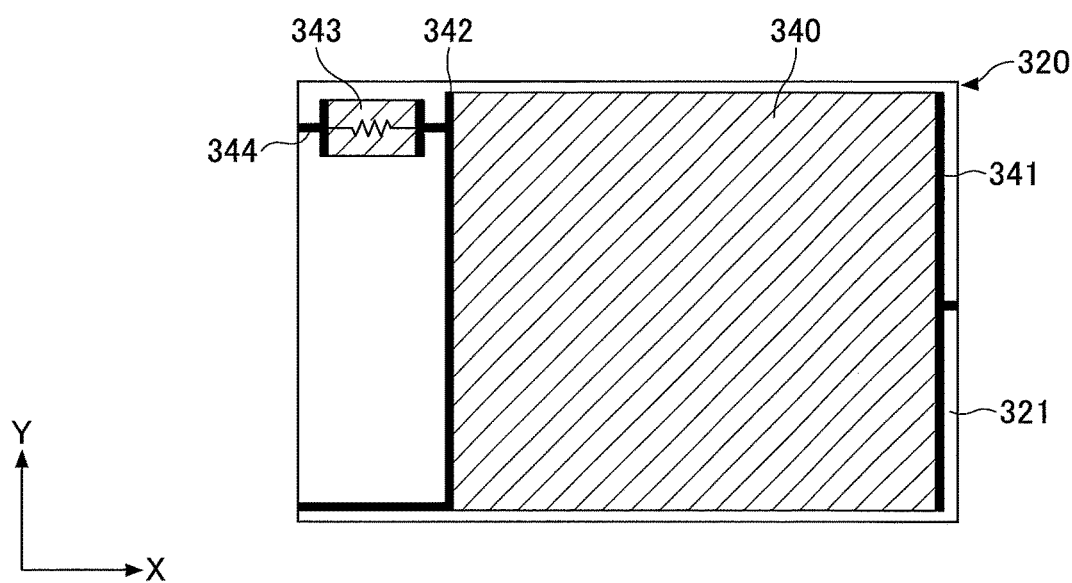
FIG. 18 is a plan view of an example of a lower electrode substrate of a touch panel of the third embodiment.

FIG. 17 is a plan view of an example of an upper electrode substrate 310 of a touch panel of the third embodiment. FIG. 18 is a plan view of an example of a lower electrode substrate 320 of the touch panel of the third embodiment.

The structure of the touch panel of the embodiment is explained with reference to FIG. 17 and FIG. 18. The touch panel of the embodiment includes the upper electrode substrate 310 and the lower electrode substrate 320. Here, in FIG. 17 and FIG. 18, leader lines or the like are not shown.

As shown in FIG. 17, the upper electrode substrate 310 includes a substantially rectangular insulating film substrate 311, a transparent upper conductive layer 330 formed at one surface of the insulating film substrate 311, electrodes 331 and 332 positioned near ends of the transparent upper conductive layer 330 in the Y-axis direction along the X-axis direction, an electrode 334, and a first resistor portion 333 provided between the electrodes 332 and 334.

The transparent upper conductive layer 330 is made of an ITO or the like. The electrodes 331, 332 and 334 are respectively made of metal or the like.

The first resistor portion 333 is made of the material same as that of the transparent upper conductive layer 330 of the upper electrode substrate 310. The first resistor portion 333 may be formed by selectively removing a part of the transparent conductive layer (330), which is a periphery of a region which becomes the first resistor portion 333 by etching or the like. The first resistor portion 333 has the same function as the first resistor portion 133 of the first embodiment. It means that the first resistor portion 333 is formed by a part of the transparent conductive layer, the rest of which composes the electrode layer, and provided at the same level as the rest of the transparent conductive layer that composes the electrode.

As shown in FIG. 18, the lower electrode substrate 320 includes a substantially rectangular glass substrate 321 corresponding to the upper electrode substrate 310, a transparent lower conductive layer 340 formed at one surface of the glass substrate 321, electrodes 341 and 342 positioned near ends of the transparent lower conductive layer 340 in the X-axis direction along the Y-axis direction, an electrode 344, and a second resistor portion 343 provided between the electrodes 342 and 344.

The transparent lower conductive layer 340 is made of an ITO or the like. The electrodes 341 342, and 332 are respectively made of metal or the like.

The second resistor portion 343 is made of the material same as that of the transparent lower conductive layer 340 of the lower electrode substrate 320. The second resistor portion 343 may be formed by selectively removing a part of the transparent conductive layer (340), which is a periphery of a region which becomes the second resistor portion 343, by etching or the like. The second resistor portion 343 has the same function as the second resistor portion 143. It means that the second resistor portion 343 is formed by a part of the transparent conductive layer, the rest of which composes the electrode layer, and provided at the same level as the rest of the transparent conductive layer that composes the electrode.

The upper electrode substrate 310 and the lower electrode substrate 320 are stacked such that the transparent upper conductive layer 330 and the transparent lower conductive layer 340 face each other and peripheral portions of the upper electrode substrate 310 and the lower electrode substrate 320 are bonded by a double-sided tape, an adhesive resin, paste or the like.

The touch panel of the embodiment further includes a flexible substrate (not shown in the drawing) for connecting the electrodes 331, 332, 334, 341, 342 and 344 or the like with an external device.

The first resistor portion 333 may be formed as follows. First, a transparent conductive layer is formed on an entire surface of the insulating film substrate 311. Then, a part of the transparent conductive layer at the upper side in FIG. 17 other than the areas which become the first resistor portion 333 and the transparent upper conductive layer 330 is removed by laser ablation, dry-etching, wet-etching or the like so that the first resistor portion 333 and the transparent upper conductive layer 330 are patterned to be formed by the remaining portion(s).

Similarly, the second resistor portion 343 may be formed as follows. First, a transparent conductive layer is formed on an entire surface of the glass substrate 321. Then, a part of the transparent conductive layer at the left side in FIG. 18 other than the areas which become the second resistor portion 343 and the transparent lower conductive layer 340 is removed by laser ablation, dry-etching, wet-etching or the like so that the second resistor portion 343 and the transparent lower conductive layer 340 are patterned to be formed by the remaining portion(s).

In this embodiment, as the first resistor portion 333 and the second resistor portion 343 are made of the ITO or the like same as the transparent upper conductive layer 330 and the transparent lower conductive layer 340, respectively, a process for mounting resistor chips is not necessary. Thus, the touch panel having a multi-touch detecting function can be manufactured with a lower cost. Further, as the first resistor portion 333 and the second resistor portion 343 are made of the material same as that of the transparent upper conductive layer 330 and the transparent lower conductive layer 340, respectively, the characteristic of the first resistor portion 333 and the second resistor portion 343 changes in accordance with the change of the characteristic of the transparent upper conductive layer 330 and the transparent lower conductive layer 340 by an environment or elapsed time.

This means that the relationship between the resistance value of the first resistor portion 333 between the electrode 332 and 334, and the resistance value of the transparent upper conductive layer 330 between the electrodes 331 and 332, does not change even by the environment or elapsed time. Similarly, the relationship between the resistance value of the second resistor portion 343 between the electrodes 342 and 344, and the resistance value of the transparent lower conductive layer 340 between the electrodes 341 and 342 does not change even by the environment or elapsed time.

Thus, according to the present embodiment, the accuracy of detection does not change largely based on the environment where the touch panel is placed or elapsed time.

Further, the first resistor portion 333 and the second resistor portion 343 may be formed to be in a similar status as the transparent upper conductive layer 330 or the transparent lower conductive layer 340, respectively. In that case, the characteristic of the first resistor portion 333 and the second resistor portion 343 can be maintained similar to that of the transparent upper conductive layer 330 and the transparent lower conductive layer 340, respectively. Therefore, the first resistor portion 333 and the second resistor portion 343 can function as good reference resistors to maintain the relationships between the above described resistance values.

Further, the first resistor portion 333 and the second resistor portion 343 may be formed to be in a similar status as the transparent upper conductive layer 330 or the transparent lower conductive layer 340, respectively. In that case, the characteristic of the first resistor portion 333 and the second resistor portion 343 can be maintained similar to that of the transparent upper conductive layer 330 and the transparent lower conductive layer 340, respectively. Therefore, the first resistor portion 333 and the second resistor portion 343 can function as good reference resistors, as explained above with reference to FIG. 24, to maintain the relationships between the above described resistance values.

For example, when the dot spacers (not shown in the drawings) are formed at a surface of the transparent upper conductive layer 330 or the transparent lower conductive layer 340, similar dot spacers (not shown in the drawings) made of photoresist or the like may be formed at a surface of the first resistor portion 333 or the second resistor portion 343.

Further, the transparent conductive layers 330 and 340 are similar to the transparent conductive layers 130 and 140 of the first embodiment, the electrodes 331, 332, 341 and 342 are similar to the electrodes 131, 132, 141 and 142 of the first embodiment, respectively. Further the structure and the operation which are not described specifically are also the same as those of the first embodiment.

Although the first resistor portion 333 and the second resistor portion 343 are formed at different sides of the transparent conductive layers 330 and 340 (the first resistor portion 333 is formed at the upper side while the second resistor portion 343 is formed at the left side in FIG. 17 and FIG. 18, respectively), the first resistor portion 333 and the second resistor portion 343 may be formed at the same side of the transparent conductive layers 330 and 340.

Fourth Embodiment

The fourth embodiment is explained. In this embodiment, similar to the third embodiment, the resistor portions are made of the same material as that of the transparent conductive layers of the upper electrode substrate and the lower electrode substrate, respectively. Further, the first resistor portion and the second resistor portion are respectively made of plural blocks of the transparent conductive layer.

With this structure, an area of the touch panel can be enlarged.

Figure 19:
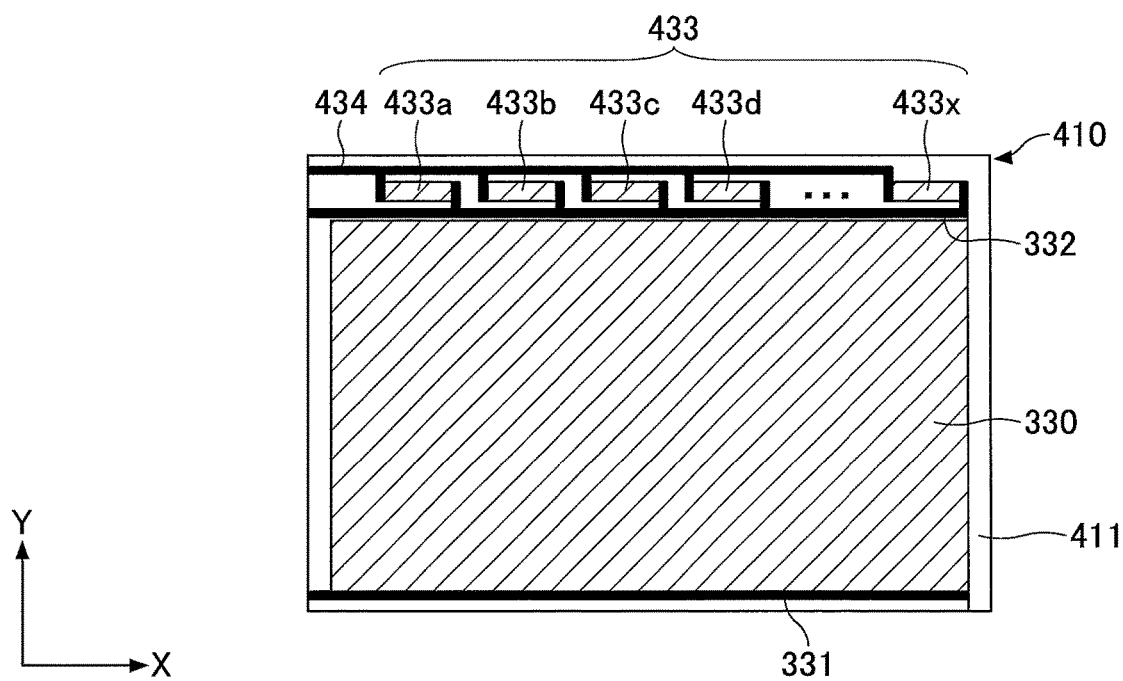
FIG. 19 is a plan view of an example of an upper electrode substrate of a touch panel of a fourth embodiment.
Figure 20:
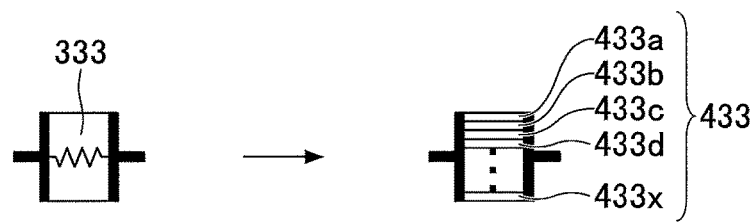
FIG. 20 is a view of a resistor portion of the upper electrode substrate of the touch panel of the fourth embodiment.
Figure 21:
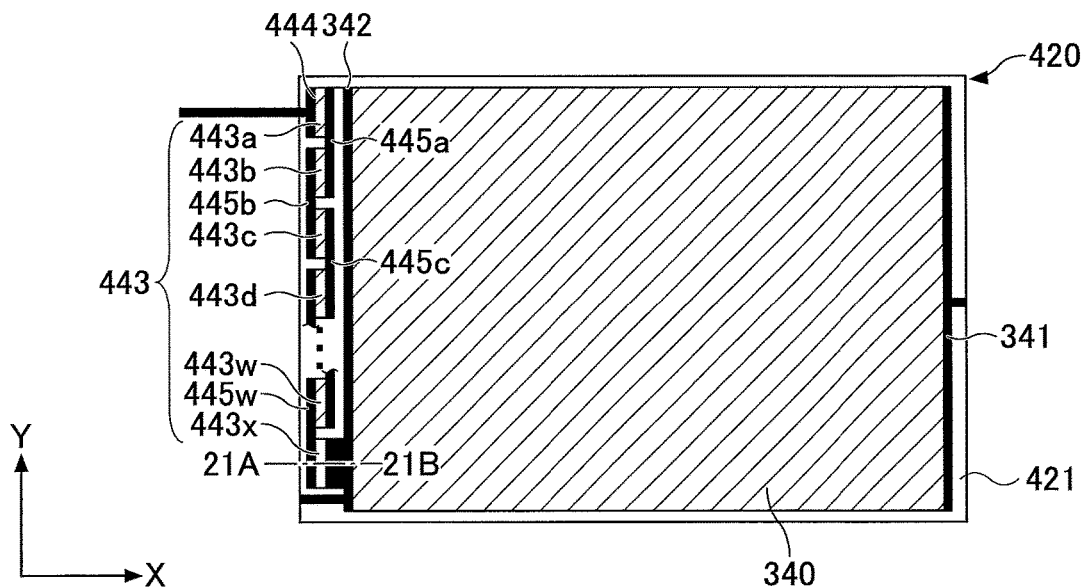
FIG. 21 is a plan view of an example of a lower electrode substrate of a touch panel of the fourth embodiment.
Figure 22:
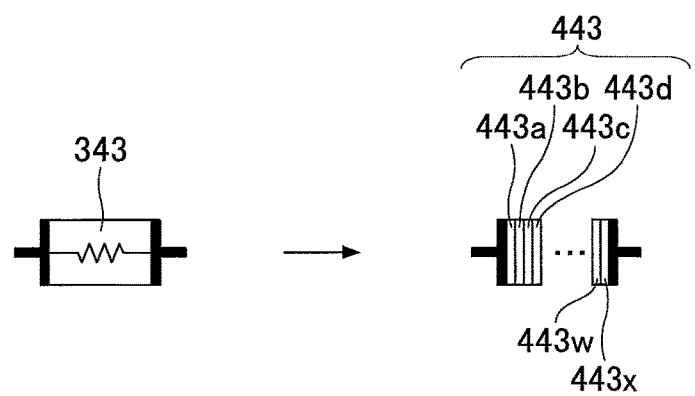
FIG. 22 is a view of a resistor portion of the lower electrode substrate of the touch panel of the fourth embodiment.

FIG. 19 is a plan view of an example of an upper electrode substrate 410 of a touch panel of the fourth embodiment. FIG. 20 is a view of a first resistor portion 433 of the upper electrode substrate 410 of the touch panel of the fourth embodiment. FIG. 21 is a plan view of an example of a lower electrode substrate 420 of the touch panel of the fourth embodiment. FIG. 22 is a view of a second resistor portion 443 of the lower electrode substrate 420 of the touch panel of the fourth embodiment.

The touch panel of the embodiment is explained with reference to FIG. 19 to FIG. 22.

The touch panel of the embodiment includes the upper electrode substrate 410 and the lower electrode substrate 420. In FIG. 19 and FIG. 21, leader lines or the like are not shown.

As shown in FIG. 19, the upper electrode substrate 410 includes a substantially rectangular insulating film substrate 411, the transparent upper conductive layer 330 formed at one surface of the insulating film substrate 411, the electrodes 331 and 332 positioned near ends of the transparent upper conductive layer 330 in the Y-axis direction along the X-axis direction, an electrode 434, and a first resistor portion 433 provided between the electrodes 332 and 434.

The transparent upper conductive layer 330 is made of an ITO or the like. The electrodes 331, 332 and 434 are respectively made of metal or the like.

In this embodiment, the first resistor portion 433 is provided with plural resistor blocks 433a, 433b, 433c, 433d, ... , and 433x separated in the X-axis direction. The resistor blocks 433a to 433x are positioned at the upper side of the transparent upper conductive layer 330 in this example. The resistor blocks 433a to 433x of the first resistor portion 433 are made of the same material as that of the transparent upper conductive layer 330 of the upper electrode substrate 410. The resistor blocks 433a to 433x may be formed by selectively removing a part of the transparent conductive layer (330), which is a periphery of regions which eventually become the resistor blocks 433a to 433x, by etching or the like.

The plural resistor blocks 433a to 433x of the first resistor portion 433 are electrically connected with each other through wirings or electrodes such as the electrode 434 and the electrode 332. The resistor blocks 433a to 433x may be connected with each other in parallel or serial based on the resistance value required for the first resistor portion 433. In this embodiment, the case where the resistor blocks 433a to 433x of the first resistor portion 433 are connected with each other in parallel is shown in FIG. 19. As shown in FIG. 20, the resistor blocks 433a to 433x of the first resistor portion 433 of the fourth embodiment is similar to the structure where the first resistor portion 333 of the third embodiment is separated into plural resistor blocks along a direction in which the current flows.

Referring back to FIG. 19, one end of the resistor blocks 433a to 433x are electrically connected to the electrode 332 and the other end of the resistor blocks 433a to 433x are electrically connected to the electrode 434.

Further, as shown in FIG. 21, the lower electrode substrate 420 includes a substantially rectangular glass substrate 421 corresponding to the upper electrode substrate 410, the transparent lower conductive layer 340 formed at one surface of the glass substrate 421, electrodes 341 and 342 positioned near ends of the transparent lower conductive layer 340 in the X-axis direction along the Y-axis direction, an electrode 344, and a second resistor portion 443 provided between the electrodes 342 and 444.

The transparent lower conductive layer 340 is made of an ITO or the like. The electrodes 341 342, and 444 are respectively made of metal or the like.

In this embodiment, the second resistor portion 443 is provided with plural resistor blocks 443a, 443b, 443c, 443d, ... , 443w, and 443x separated in the Y-axis direction. The resistor blocks 443a to 443x are positioned at the left side of the transparent lower conductive layer 340. The resistor blocks 443a to 443x of the second resistor portion 443 are made of the material same as that of the transparent lower conductive layer 340 of the lower electrode substrate 420. The resistor blocks 443a to 443x may be formed by selectively removing a part of the transparent conductive layer (340), which is a periphery of regions which become the resistor blocks 443a to 443x, by etching or the like.

Similar to the plural resistor blocks 433a to 433x of the first resistor portion 433, the resistor blocks 443a to 443x of the second resistor portion 443 are electrically connected with each other through wirings or electrodes. The resistor blocks 443a to 443x may be connected with each other in parallel or serial based on the resistance value required for the second resistor portion 443.

In this embodiment, the case where the resistor blocks 443a to 443x of the second resistor portion 443 are connected with each other in serial is shown in FIG. 21. Specifically, the adjacent resistor blocks of the resistor blocks 443a to 443x are connected through wirings 445a to 445w, respectively.

As shown in FIG. 22, the resistor blocks 443a to 443x of the second resistor portion 443 of the fourth embodiment is similar to the structure where the second resistor portion 343 of the third embodiment is separated into plural resistor blocks along a direction perpendicular to the direction in which the current flows.

Referring back to FIG. 21, one end of the resistor block 443x is electrically connected to the electrode 342, the other end of the resistor block 443x is electrically connected to the adjacent resistor block 443w through the wiring 445w, . . . , the other end of the resistor block 443b is electrically connected to one end of the adjacent resistor block 443a through the wiring 445a, and the other end of the resistor block 443a is electrically connected to the electrode 444.

In this embodiment, as the transparent upper conductive layer 330 and the transparent lower conductive layer 340 has a shape where the length in the X-axis direction is longer than the length in the Y-axis direction, the resistance value of the transparent lower conductive layer 340 between the electrodes 341 and 342 becomes greater than the resistance value of the transparent upper conductive layer 330 between the electrodes 331 and 332. Thus, the second resistor portion 443 for the transparent lower conductive layer 340 is necessary to have a greater resistance value than the first resistor portion 433 for the transparent upper conductive layer 330. Therefore, by connecting the resistor blocks 443a to 443x of the second resistor portion 443 in serial while connecting the resistor blocks 433a to 433x of the first resistor portion 433 in parallel, the resistance value of the second resistor portion 443 can be set greater, in this embodiment.

Figure 23:
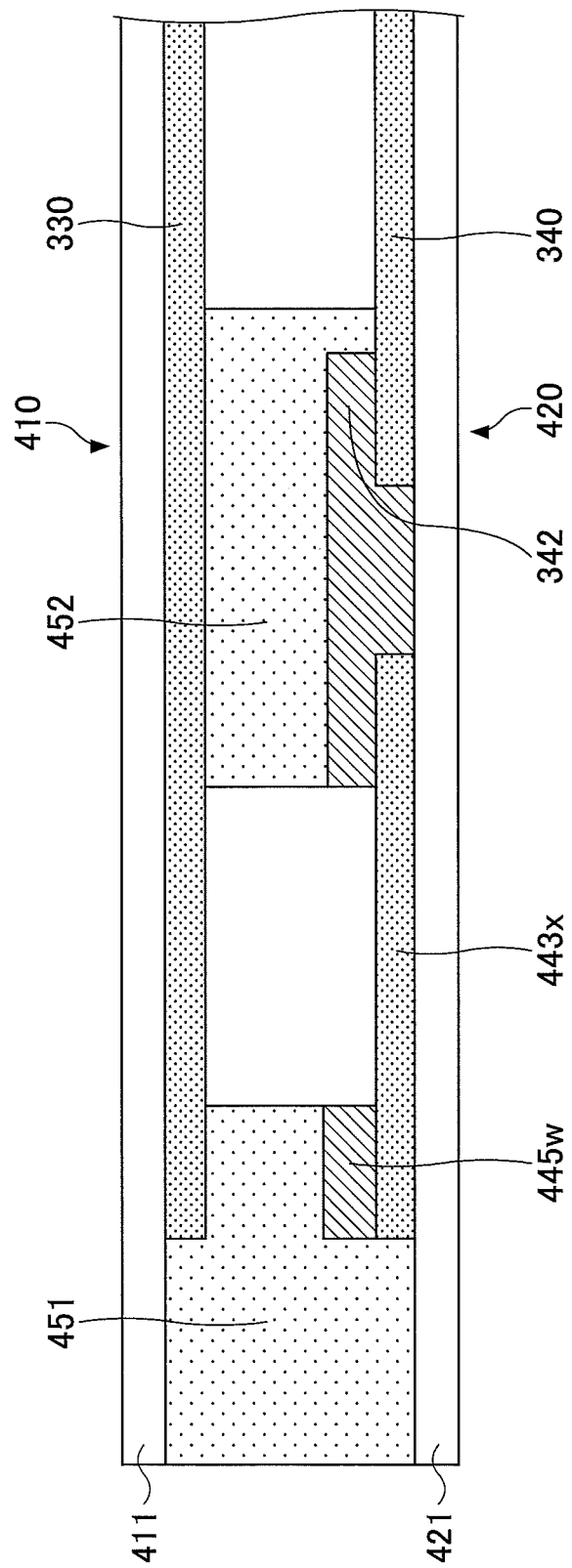
FIG. 23 is a cross-sectional view of the lower electrode substrate of the touch panel of the fourth embodiment.

FIG. 23 is a cross-sectional view of the lower electrode substrate 420 of the touch panel of the fourth embodiment taken along a 21A-21B line.

The upper electrode substrate 410 and the lower electrode substrate 420 are bonded by adhesive material 451 provided above the wiring 445w and a peripheral portion, and adhesive material 452 provided above the electrode 342. In this embodiment, the adhesive material is not provided above the second resistor portion 443 such as the resistor portion 443x or the like nor above the transparent lower conductive layer 340. With this structure, the characteristics of the first resistor portion 433, the second resistor portion 443, the transparent upper conductive layer 330, and the transparent lower conductive layer 340 can be maintained. Further, with this structure, the characteristic of the first resistor portion 433 and the second resistor portion 443 can be maintained similar to that of the transparent upper conductive layer 330 and the transparent lower conductive layer 340, respectively. Therefore, similar to as described above for the first resistor portion 333 and the second resistor portion 343, the first resistor portion 433 and the second resistor portion 443 can function as good reference resistors to maintain the relationships between the above described resistance values.

Further, similar to the transparent lower conductive layer 340, dot spacers (not shown in the drawings) made of photoresist or the like may be formed on the second resistor portion 443 (resistor blocks 443a to 443x).

Further, dot spacers may be formed on the transparent lower conductive layer 340, and when the insulating dot spaces are formed on the transparent lower conductive layer 340, similar dot spacers (not shown in the drawings) may be formed on the first resistor portion 433 (resistor blocks 433a to 433x) of the upper electrode substrate 410.

According to the touch panel of the embodiment, the first resistor portion 433 and the second resistor portion 443 are formed to be separated, respectively. Therefore, the width necessary for the first resistor portion 433 and the second resistor portion 443 on the insulating film substrate 311 and the glass substrate 321, respectively, can be reduced. With this, an area of the touch panel can be enlarged.

Although in this embodiment, the case where the plural resistor blocks 433a to 433x of the first resistor portion 433 are electrically connected with each other in parallel, while the resistor blocks 443a to 443x of the second resistor portion 443 are electrically connected with each other in serial, is shown, however, the following cases may be adapted based on the required resistance values, the number of resistor blocks, shapes of the resistor blocks or the like.

For example, the resistor blocks 433a to 433x of the first resistor portion 433 may also be connected with each other in serial, while the resistor blocks 443a to 443x of the second resistor portion 443 are connected with each other in serial. Alternatively, the resistor blocks 443a to 443x of the second resistor portion 443 may also be connected with each other in parallel while the resistor blocks 433a to 433x of the first resistor portion 433 are connected with each other in parallel. Alternatively, the resistor blocks 433a to 433x of the first resistor portion 433 may be connected with each other in serial, while the resistor blocks 443a to 443x of the second resistor portion 443 are connected with each other in parallel. Further, alternatively, some blocks of the first resistor portion 433 or the second resistor portion 443 may be connected with each other in parallel, while other blocks of the first resistor portion 433 or the second resistor portion 443 are connected with each other in serial. Any combination can be adapted to adjust the resistance value of the first resistor portion 433 or the second resistor portion 443.

Further, the first resistor portion 433 and the second resistor portion 443 may be formed at the same side of the transparent conductive layers 330 and 340. Specifically, the first resistor portion 433 and the second resistor portion 443 may be formed to overlap with each other when seen as a plan view.

According to the embodiment, a touch panel capable of detecting multi-touches without the size of the touch panel becoming larger or the cost of the touch panel becoming higher can be provided.

The present invention is not limited to the specifically disclosed embodiments, and variations and modifications may be made without departing from the scope of the present invention.

What is claimed is:
1. A touch panel comprising:
an upper electrode substrate including an upper conductive layer;
a lower electrode substrate including a lower conductive layer;
a first electrode and a second electrode respectively provided at first and second ends of the upper conduc- tive layer in a first direction for causing an electric potential distribution in the first direction;
a third electrode and a fourth electrode respectively provided at third and fourth ends of the lower conductive layer in a second direction perpendicular to the first direction for causing an electric potential distribution in the second direction;
a fifth electrode provided at the first end of the upper conductive layer; and
a first resistor portion formed at the upper electrode substrate at the first end of the upper conductive layer,
wherein the first resistor portion is made of a material same as that of the upper conductive layer,
wherein the first resistor portion electrically connects the first electrode and the fifth electrode,
wherein the first resistor portion is formed to be separated into plural resistor blocks which are connected in series, and
wherein the plural resistor blocks of the first resistor portion are aligned along the first electrode in the second direction.

2. The touch panel according to claim 1, further comprising:
a second resistor portion connected to either of the third electrode or the fourth electrode and formed at the lower electrode substrate,
wherein the second resistor portion is formed to be separated into plural resistor blocks which are electrically connected with each other.

3. The touch panel according to claim 1, further comprising:
a plurality of first wirings provided at the first end of the upper conductive layer and aligned along the first electrode in the second direction between the first electrode and the plural resistor blocks; and
a plurality of second wirings provided at the first end of the upper conductive layer and aligned along the first electrode in the second direction such that the plural resistor blocks are disposed between the plurality of first wirings and the plurality of second wirings,
wherein each of the plurality of first wirings connects the resistor blocks adjacent to each other in the second direction, and each of the plurality of second wirings connects the resistor blocks adjacent to each other such that the plural resistor blocks are connected in series by the plurality of first wirings and the plurality of second wirings between the first electrode and the second electrode.

4. The touch panel according to claim 3, wherein the plurality of first wirings and the plurality of second wirings are provided to be shifted from each other in the second direction such that one of the first wirings faces two of the second wirings adjacent to each other while interposing two of the resistor blocks with the two of the second wirings, respectively, and one of the second wirings faces two of the first wirings adjacent to each other while interposing two of the resistor blocks with the two of the first wirings, respectively.

5. A touch panel comprising:
an upper electrode substrate including an upper conductive layer;
a lower electrode substrate including a lower conductive layer;
a first electrode and a second electrode respectively provided at first and second ends of the upper conductive layer in a first direction for causing an electric potential distribution in the first direction;
a third electrode and a fourth electrode respectively provided at third and fourth ends of the lower conductive layer in a second direction perpendicular to the first direction for causing an electric potential distribution in the second direction;
a fifth electrode provided at the first end of the upper conductive layer; and
a first resistor portion formed at the upper conductive layer at the first end of the upper conductive layer, made of a material same as that of the upper conductive layer, and that electrically connects the first electrode and the fifth electrode,
wherein the first resistor portion is formed to be separated into three or more plural resistor blocks which are connected in parallel, and
wherein the plural resistor blocks of the first resistor portion are aligned along the first electrode in the second direction.

6. The touch panel according to claim 5, wherein the fifth electrode is aligned along the first electrode in the second direction so that the plural resistor blocks are interposed between the first electrode and the fifth electrode and are connected in parallel by the first electrode and the fifth electrode.

* * * * *